Patented June 6, 1933

1,912,702

UNITED STATES PATENT OFFICE

CHRISTIAN GAMARRA, OF BOSTON, MASSACHUSETTS

METHOD OF MAKING AERATED GYPSUM AND RESULTING PRODUCT

No Drawing. Application filed June 23, 1928, Serial No. 287,887. Renewed October 12, 1932.

This invention relates to a method of making aerated gypsum and to the resulting product which is characterized by substantial resistance to weather and water and which is hard, strong and otherwise suitable for use in the desired shapes into which it may be fashioned.

It has heretofore been proposed to make "aerated" or porous gypsum products by mixing calcined gypsum with an addition of soluble carbonate, such as sodium bicarbonate, and an acid such as sulfuric acid or an acidic salt such as alum, and then adding water, whereupon the mixture effervesces and subsequently sets. In such procedure, a large part of the carbon dioxide escapes and leaves a porous but very weak structure, readily softened or dissolved by water and not uniform.

A method of procedure has been described in my copending application Serial No. 225,835, filed October 12, 1927, whereby the objections to such procedure and to the resulting product may be overcome by taking advantage of the relatively insoluble carbonate content which is found to be inherent in commercial calcined gypsum. This process, broadly, comprises the step of gradually liberating the carbon dioxide content by the addition of a suitable reactive salt in conjunction with a weak acid characterized by reacting with the salt to form an insoluble product and to liberate the acid of the salt.

The method of the present invention includes generally the step of incorporating or mixing with commercially calcined gypsum (characteristically containing a relatively insoluble carbonate content) a soluble acid salt of a polyvalent acid characterized by being capable of reaction with an alkaline earth metal (e.g. the calcium of the gypsum or its carbonate content) to produce a relatively insoluble compound and gradually to liberate carbon dioxide therefrom.

It is also found that the aerating effect, as well as the desirable properties of the product obtained, may be further improved by adding an acid to the mixture (e. g., an acid suitable to maintain the acidity of the reaction mass and also to form a relatively insoluble salt).

A typical instance of the application of the method will be described, (A) as carried out with gypsum and the addition of sodium acid phosphate alone and also (B) in conjunction with the further addition of tartaric acid.

Calcined gypsum, of the usual commercial grade and containing an appreciable carbonate content, is preferably pulverized and mixed with the reagent salt or reagents, as the case may be, preferably in the dry condition. Water may conveniently be run into the mold in which the material is to be prepared and formed, in suitable quantity to produce the desired consistency, and the gypsum mixture added thereto with sufficient agitation to make the mass of relatively uniform composition. But the agitation is not unduly prolonged, since this tends to facilitate the escape of gases and thus reduce the degree of aeration otherwise obtainable. The mass is then allowed to set. This takes place in a few moments to a sufficient degree to permit the removal of the mold walls from the molded object. The setting reaction then continues until the maximum of hardness and strength is attained and the object is finished, although it may be cut or otherwise shaped, if desired.

The relative proportions of the several materials may vary according to the specific result desired, but the following compositions, in parts by weight, are representative of satisfactory practice for general purposes:

(A) 500 grams calcined gypsum
    7.5 grams $Na_2HPO_4$ (or $NaH_2PO_4$)
    280 c.c. water or (B) 500 grams calcined gypsum
    10 grams $Na_2HPO_4$ (or $NaH_2PO_4$)
    5 grams $H_2C_4H_4O_6$
    280 c.c. water The reaction of the acid salt to produce carbon dioxide is effective to form a satisfactory "aerated" or porous structure, and the reaction product is substantially insoluble and water resistant as well as strong, hard and uniform. But if an increased degree or rate of aeration is desired, the addition of a free organic acid, such as tartaric acid, accomplishes this result with greater facility and to a greater extent than either the acid or acid salt separately. Moreover, the reaction product is likewise water resistant and uniform and the strength of the molded body is not seriously reduced unless the amount of aeration is carried to an extensive degree.

It is thought that such acceleration and increase of effectiveness of the acid phosphate by the tartaric acid may be attributed to its maintenance of the degree of acidity of the acid salt throughout the reaction period according to the following reactions:—

$$Na_2HPO_4 + H_2C_4H_4O_6 \rightarrow Na_2C_4H_4O_6 + H_3PO_4$$
$$2H_3PO_4 + 3CaCO_3 \rightarrow Ca_3(PO_4)_2 + 3H_2O + 3CO_2$$

while the more soluble calcium sulfate reacts to form less soluble calcium tartrate:

$$CaSO_4 + Na_2C_4H_4O_6 \rightarrow CaC_4H_4O_6 + Na_2SO_4.$$

But whatever the mechanism of the reaction, it is to be observed that the resulting compounds of the reaction, are relatively insoluble while the water and carbon dioxide serve the desired purpose of aerating the solidified body and escape after this function has been performed.

The product is consequently of a porous structure which may be definitely determined and controlled by the relative amounts of the materials used in the cementitious composition from which it is made. It is both strong and waterproof, and may be used to advantage wherever these qualities are required. The molded or free surfaces are dense, uniform and pure white—or porous and open on cut or fractured surfaces. Hence it is especially suitable as a building material whose light weight is important and the application of decorative materials to the surfaces is to be considered.

I claim:

1. A method of treating commercial calcined gypsum containing calcium carbonate, which comprises the step of mixing the same with water and a soluble acid phosphate characterized by reacting with the carbonate to liberate carbon dioxide and to form an insoluble reaction product.

2. A cementitious composition, comprising calcined gypsum containing calcium carbonate, and a small amount of an acid phosphate, said acid phosphate being characterized by solubility in water and by reaction with the carbonate to form carbon dioxide and an insoluble product.

Signed by me at Boston, Massachusetts, this 22nd day of June 1928.

CHRISTIAN GAMARRA.